Sept. 26, 1961    A. C. WINTERHALTER ET AL    3,002,180
METHOD AND APPARATUS FOR REPRODUCTION OF SEISMIC RECORDS
Filed Oct. 14, 1957                                    5 Sheets-Sheet 2

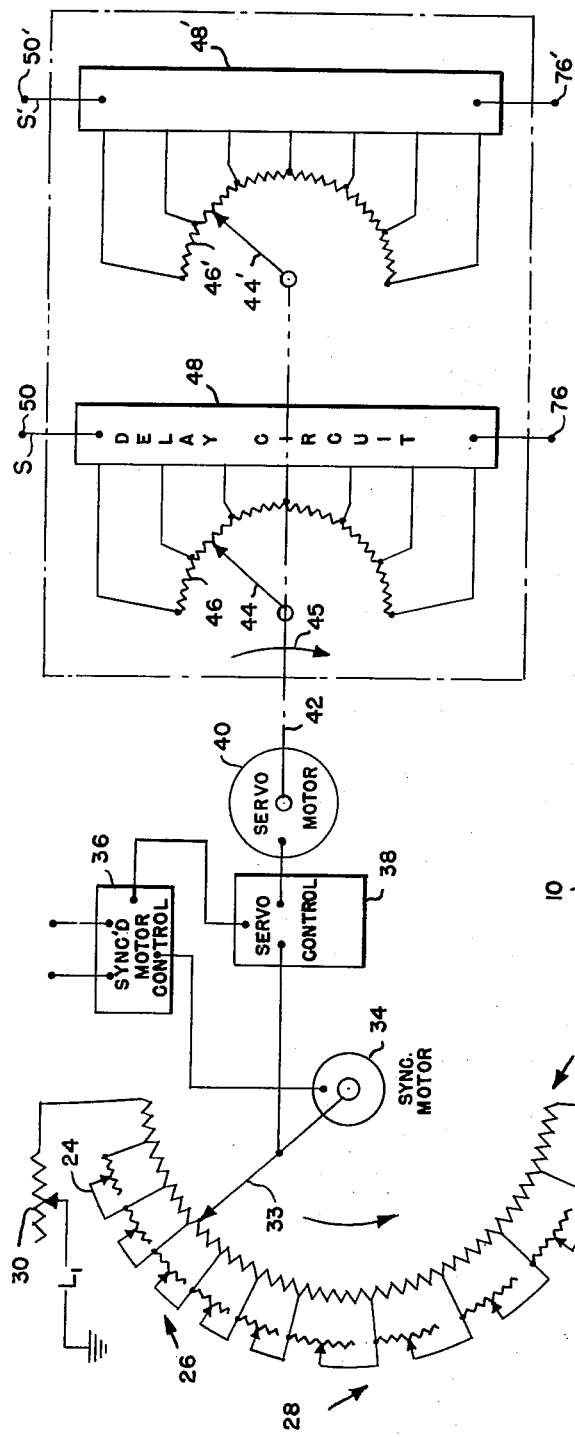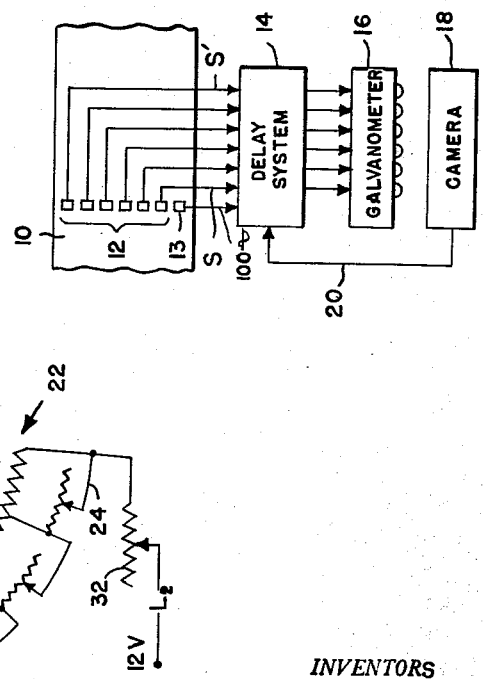

INVENTORS
ALFRED C. WINTERHALTER
BY & WILLIAM T. EVANS

ATTORNEYS

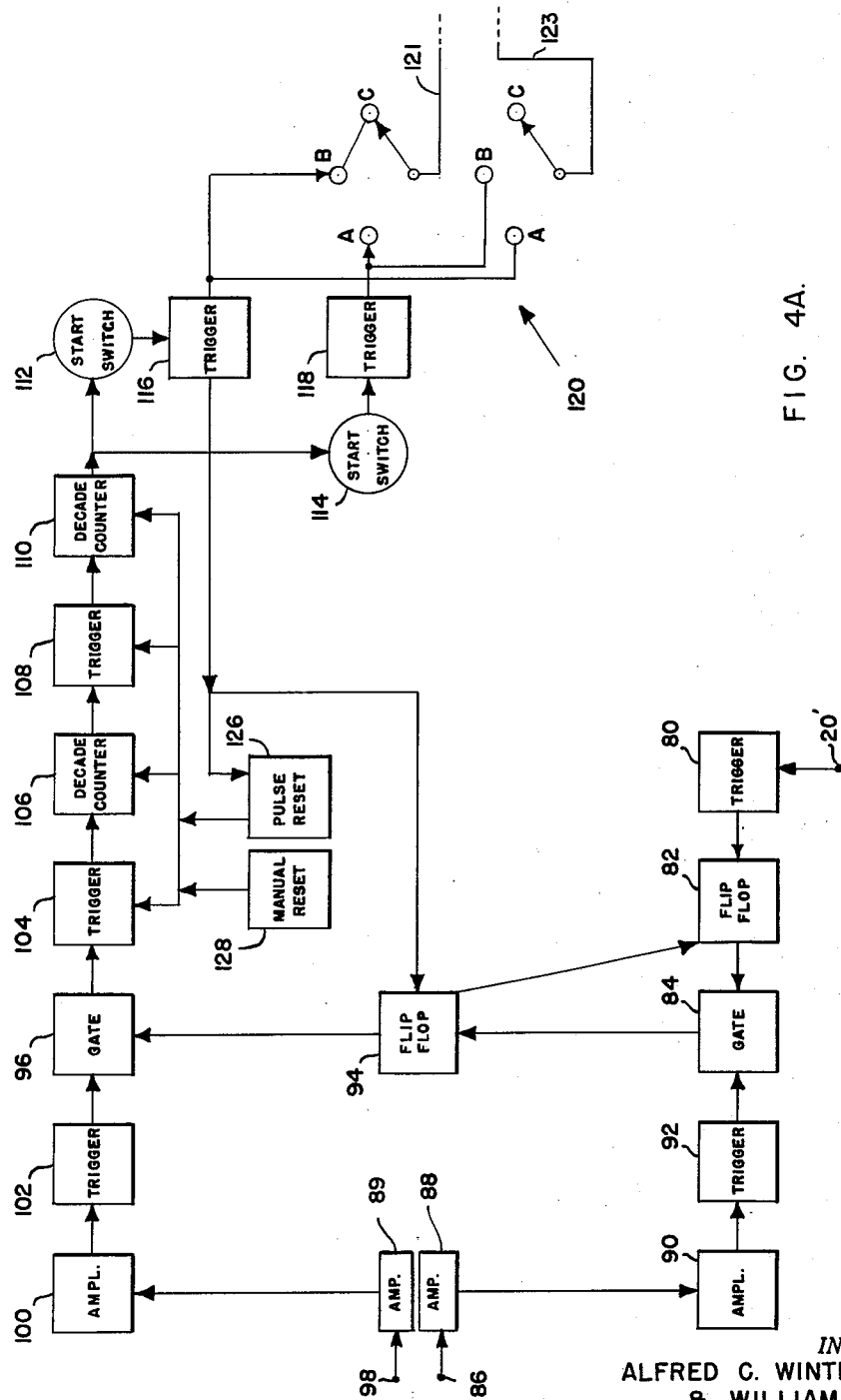

Sept. 26, 1961   A. C. WINTERHALTER ET AL   3,002,180
METHOD AND APPARATUS FOR REPRODUCTION OF SEISMIC RECORDS
Filed Oct. 14, 1957   5 Sheets-Sheet 4

INVENTORS
ALFRED C. WINTERHALTER
BY & WILLIAM T. EVANS

ATTORNEYS

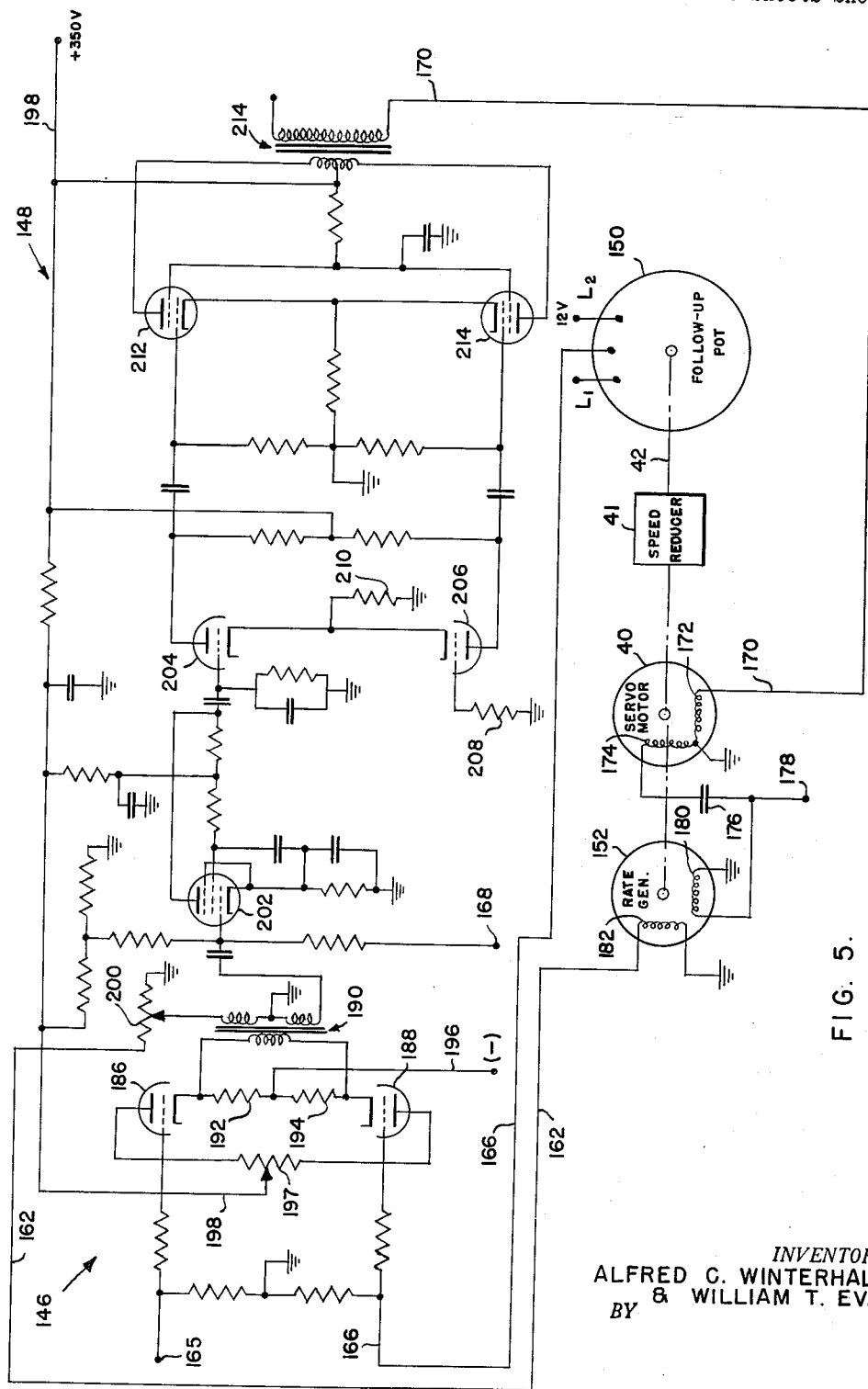

United States Patent Office 3,002,180
Patented Sept. 26, 1961

3,002,180
METHOD AND APPARATUS FOR REPRODUCTION OF SEISMIC RECORDS
Alfred C. Winterhalter and William T. Evans, Beaumont, Tex., assignors to Sun Oil Company, Philadelphia, Pa., a corporation of New Jersey
Filed Oct. 14, 1957, Ser. No. 690,121
18 Claims. (Cl. 340—15)

This invention relates to the reproduction of seismic records and has particular reference to a method of and apparatus for introducing step-out corrections in the reproduction of seismic records.

It is customary practice in the art of geophysical prospecting to obtain records from a plurality of detector stations in response to an explosive shot which may be fired in the vicinity of the surface of the earth, or below the surface of the earth. There may be as many as twenty or thirty, or more, detectors disposed in a definite pattern over the surface of the earth, which receive energy from the shot in the form of waves reflected from various subsurface earth strata.

It is quite common to produce records from a plurality of successive shots, the signals from each of the shots being picked up by strings of detectors which extend in opposite directions away from the shot point and in a straight line along the surface of the earth. The records made in the field may conveniently be in the form of magnetic recordings in which all of the records made from a single shot are recorded side by side on a single magnetic tape. These records are brought to a laboratory for reproduction, at which time the original records are filtered and otherwise modified to accentuate the maximum possible amount of information which normally exists in the seismic records. The filtered and modified records are reproduced on photographic film by means of a photographic oscillograph and the individual records, as obtained by each of the detectors, may then be studied and compared. Alternatively or additionally, the magnetic records, with or without filtering and/or modification, may be combined and reproduced on photographic film for study and comparison.

The visual study and comparison of these individual records is difficult because of various factors which serve to cause displacements between related portions of the records of adjacent detectors.

The factors serving to cause displacement between records may be considered as arising from two general sources. The first of these gives rise to displacements among the various records as a result of the condition of the earth immediately adjacent to each individual detector, the response rate of each individual detector and the elevation of each individual detector with respect to a common plane. The second general cause of these displacements is that the detectors themselves are displaced and thus the time interval required for the passage of waves to the furthermost detector will be greater than the time interval for the passage of waves to the nearest detector with respect to the shot point and a given subsurface reflecting horizon. These latter time displacements are, however, not constant during the period of recording and diminish in magnitude as the depth in the earth from which signals are received increases.

Broadly, it is the object of this invention to provide a method and apparatus by which a plurality of records may be positionally adjusted with relation to each other as they are reproduced from a multi-channel recording and re-recorded, preferably in visible form, in order to correct for the displacements resulting from the second cause noted above.

More specifically, it is the object of the present invention to provide an improved apparatus for step-out time correction between seismic record channels, utilizing a time delay line in each channel in which successive portions of the delay lines are added in a continuous and progressive fashion in order to increase progressively the amount of delay imposed in each channel during the period of record reproduction, and in which the rate of change of delay is determined for all of the delay lines by a function generator. The apparatus provides for delaying all channels with regard to a common reference, and the degree of correction applied to any one channel is controlled by controlling the difference in time delay between that channel and the reference, thus, increasing the time delay in a channel decreases the correction applied to that channel with regard to the common reference.

The foregoing and other objects of the invention, relating particularly to details of construction and operation thereof, will become apparent from the following description when read in conjunction with the accompanying drawings in which:

FIGURE 1 is a simplified diagram of the major components of the equipment involved, including a delay system incorporating delay circuits and a function generator;

FIGURE 2 is a diagrammatic showing of the delay circuits and function generator control means therefor involved in the delay system;

FIGURES 4A and 4B are block diagrams of the control apparatus involved in the delay system; and FIGURE 5 is an electrical diagram of a portion of the apparatus shown in FIGURE 4B.

Figure 3:
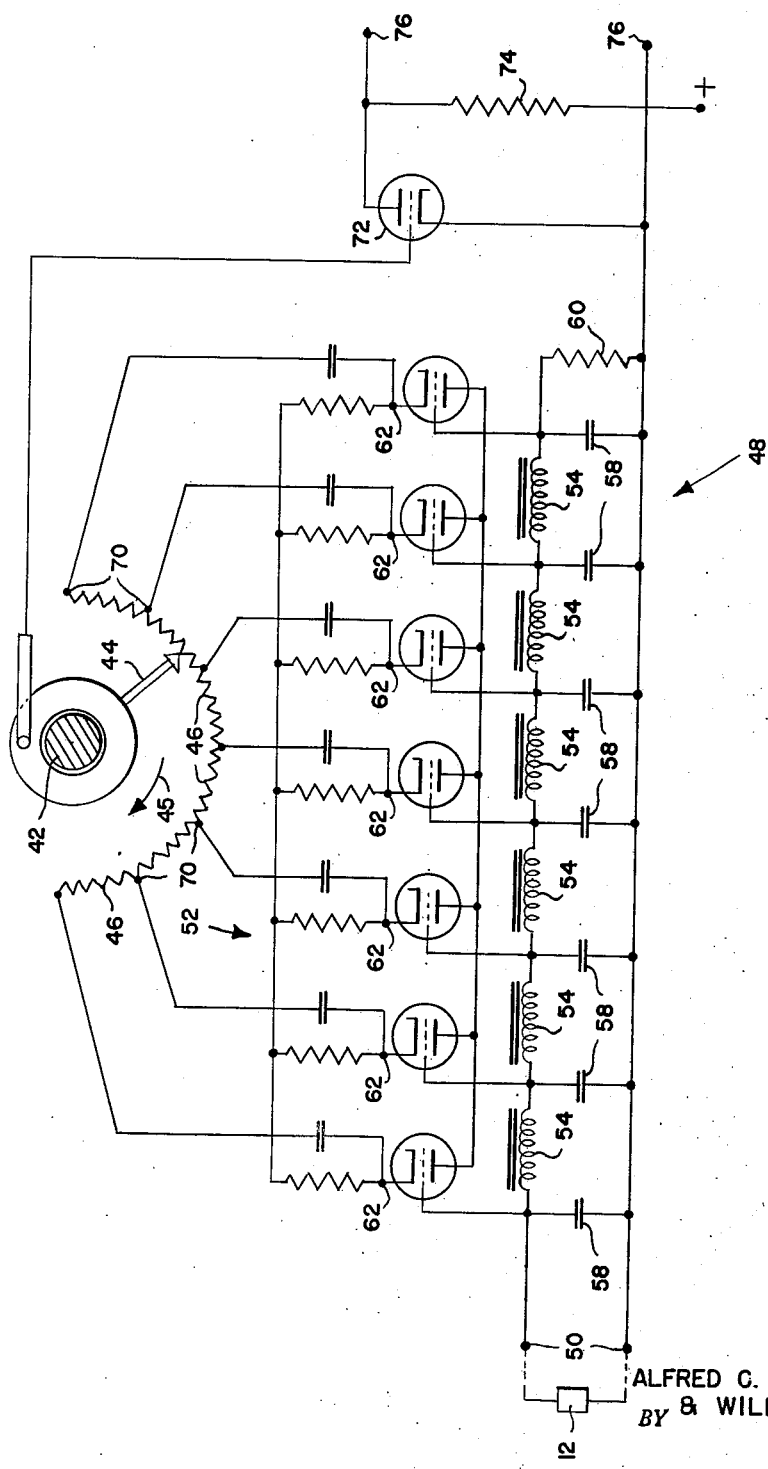
FIGURE 3 is a wiring diagram of one of the delay circuits.

In FIGURE 1, there is shown the fragmentary portion of a multi-channel record tape 10 on which there has been recorded a plurality of recordings in channels extending below pick-up heads 12. While only six pick-up heads are shown in the drawing, it will be evident that any number of heads may be employed, depending upon the number of channels being reproduced from the record member. The record member is moved past the pick-up heads in the conventional fashion and the signal output from each of the heads 12 is delivered to a delay system 14.

In the delay system 14 the various signals are individually delayed, as will be hereinafter described, and the corrected signals are delivered to a conventional galvanometer 16 which, in conjunction with a camera 18, gives rise to visual recordings of the seismic records in corrected relationship. Control connections 20, between the camera and the delay system, are provided for purposes which will be hereinafter described.

When a plurality of seismic recordings is made in the field the displacements among related events on the records will be greatest at the initial stages of the records and will become less toward the final stages of the records due to the decreasing effect of detector displacement with increase in depth in the earth from which signals are reflected. In the present apparatus the arrangement is such that the pick-up heads 12 are in linear array to provide for the simultaneous reproduction of simultaneously recorded events and the displacement imposed by the delay circuits is varied so as to introduce delay into the record channels as required in order to position corresponding events properly related with respect to their relative depths in the earth.

In FIGURE 2 there is indicated generally at 22 a precision linear potentiometer hereafter referred to as a "function potentiometer." This potentiometer is tapped to provide eleven sections, each of which, except the first, is shunted by a ten-turn precision potentiometer as indicated at 24. While not shown in the drawing, provision is desirably made for plugging in a fixed resistor across the normally unshunted first section of the potentiometer in order to permit correction for a few unusual functions that are met in practice. The first six sections, indicated generally at 26, have half the spacing of the latter five sections, indicated generally at 28. Two additional potentiometers 30 and 32 are provided in series with the function potentiometer at the beginning and end thereof, respectively, to permit setting initial and final values of correction which will be hereinafter described.

The function potentiometer slide arm 33 is driven by a synchronous motor 34 by means of a synchronous motor control 36. The output from the function potentiometer slide arm 33 is delivered to a servo control system 38, which serves to control a servo motor 40. The servo motor shaft 42 drives slide arms 44—44′ of a plurality of potentiometers 46—46′ shunting delay circuits 48—48′ through which there are delivered seismic signals of the signal channels S—S′, respectively. While only two delay circuits are shown in FIGURE 2, it will be evident that the number of circuits actually involved will be equal to the number of record channels undergoing correction. The position of each of the slide arms 44 over its associated potentiometer 46 will determine, at any particular time, the delay imposed by its associated delay circuit 48, and the rate of travel of each slide arm 44 will determine the rate of change of delay imposed by its associated delay circuit. It will be broadly evident that by this means a changing delay will be provided in each of the seismic record lines S—S′.

The time delay for which correction is made is the difference between (1) the time required for the wave energy to travel from the shot down to a reflecting horizon and back to a detector displaced horizontally from the shotpoint and (2) the time required for the wave energy to travel down to the reflecting horizon and back to a fictitious detector placed at the shotpoint. The relation between the required time corrections at spaced detector stations is essentially constant for any value of time corresponding to a reflecting horizon at a depth which is large compared to the distance between the spaced detectors. In practice, the detectors are spaced uniformly from the shotpoint to the outermost detector. Then the outermost detector requires maximum correction and each inner detector requires correction which is approximately a fixed percentage of that applied to the outer detector, regardless of the absolute value of the detector interval. In other words, the correction function applied to any channel is equal to the correction function applied to the outermost channel multiplied by a constant. Thus, it is possible to control the slide arms of the shunting potentiometers associated with each of the delay circuits by means of a single control system. While the details of the various elements of apparatus shown in FIGURE 2 will be hereinafter described, it should be noted at this time that the function potentiometer provides eleven straight line segments each representing a potential level between the potentials of line L1 and line L2. The relative values of the potential levels may be adjusted by adjustment of the shunt potentiometers 26 and 28. Thus, for any given area of seismic operations, a multi-channel seismic record may have the rates of change of correction at various times between minimum and maximum correction preestablished by the settings of the shunt potentiometers 26 and 28 of the function potentiometer 22, and the slide arm 33, which is driven by the synchronous motor 34 at a uniform rate of speed over the function potentiometer, will take off potentials which vary in accordance with the desired correction function. These correction function potentials are translated into physical displacements by the servo system and these physical displacements are imposed upon the slide arms 44 of the potentiometers shunting the delay circuits. Thus, the rate of travel of the slide arms 44 is not necessarily uniform over the entire range of travel but rather represents a correction function applied to each of the record channels with respect to time between the limits of maximum and minimum correction as provided by each of the delay circuits.

As shown in FIGURE 3, each pickup head 12 is connected to the input terminals 50 of an individual delay line, indicated generally at 48, which comprises sections indicated at 52 constituted by inductances 54 and capacitances 58, the delay line terminating in an impedance 60. This delay line may be of the type described in the article "Design of Low-Frequency Constant Time Delay Lines," by Clifford M. Wallis, in the Transactions of the American Institute of Electrical Engineers, volume 71, page 135. In practice, the delay involved in each section of the delay line may be of the order of 1 millisecond.

The terminals of the delay line sections are connected through isolating cathode follower arrangements 62 to terminals 70 of the potentiometer resistance 46 extending over the entire potentiometer resistance in even divisions. The movable contact arm 4, which is positioned by the servo motor shaft 42, contacts the series resistors provided by the potentiometer between the terminal 68 and the first terminal 70 and between the terminals 70. In designing the line, the characteristic impedance is desirably low, of the order of 500 to 1000 ohms, as compared with the higher resistances shunting the inductors so that these shunting resistances 46 will have little effect on the normal functioning of the line.

The moving contact arm 44 is connected to the grid of an amplifying triode 72 which has an anode load resistor 74 and which delivers the output for its particular channels through terminals 76.

It will be understood that an arrangement such as that illustrated in FIGURE 3 is provided for each of the pickup heads 12, and, correspondingly, for each of the record channels on the magnetic tape which is being reproduced. By reason of the interposition of the individual delay circuit and the control of the delays imparted to each delay circuit by each circuit through the action of the function potentiometer and the servo system, the proper stepout corrections will be applied to the signals introduced to each delay circuit at terminals 50 to provide corrected outputs by each circuit at terminals 76, provided the overall time delay established by each delay circuit 48 is properly selected and the rate of travel of the slide arms 44 is properly controlled by the function potentiometer and the servo system. The outputs from the terminals 76 may be treated in any desired fashion and then delivered to the galvanometer 16 for the reproduction of a visual record by the camera 18 in a conventional manner.

While, in connection with FIGURE 2, there has been described only a single function potentiometer, servo system and group of ganged delay circuit potentiometers, the complete apparatus desirably involves two such systems, one for each half of a detector spread. Details of the synchronous motor control 36 and two servo control sysetms, such as shown at 38 in FIGURE 2, will now be described in connection with the block diagrams of FIGURES 4A and 4B.

A start pulse derived from the control system of the recording camera 18 is delivered to the input terminal 20′ of FIGURE 4A and to a trigger circuit 80. The pulse is shaped by the trigger circuit 80 and delivered to a flip-flop circuit 82 which then operates to open a gate circuit 84. The time break pulse, i.e., the pulse produced at the shot instant when the seismic recordings are made, derived from the magnetic record 10 in FIGURE 1 through any of the pick-up heads 12, comes in through input terminal 86 to an amplifier 88 and is delivered through an amplifier 0 to a trigger circuit 92. The time break pulse is shaped by the trigger circuit 92 and the output of the trigger 92 passes through the open gate circuit, 84 to operates a flip-flop circuit 94 which opens a gate circuit 96. Operation of the flip-flop circuit 94 reverses the flip-flop circuit 82 and closes the gate 84. The purpose of the circuitry thus far described is to insure the commencement of circuit operation from the proper recorded time break, i.e., the shot instant, and not from noise or other spurious pulses on the tape.

At the time the original magnetic recordings are made on the record member 10, a 100 cycle timing wave is also recorded on the record member 10 in order to provide a fixed time reference for recorded events regardless of tape speed and other variable factors which exist during the production and reproduction of the seismic recordings. This 100 cycle reference wave is picked up from the record tape 10 by the pickup head 13. The 100 cycle wave is delivered to the circuit of FIGURE 4 through input terminal 98 to an amplifier 89 and through an amplifier 100 to a trigger circuit 102. The trigger circuit 102 shapes the 100 cycle wave into suitably formed pulses which pass through the open gate circuit 96 to a trigger circuit 104.

The output of the trigger circuit 104 operates a hundredths decade counter 106. Ten pulses produce an output from the counter 106 through a trigger circuit 108 to a tenths decade counter 110. The output from the tenths counter 110 is delivered to start switches 112 and 114. These start switches are each rotary selector switches by which any tenth second to one second may be selected independently by each of the switches. The outputs from the start switches 112 and 114 are delivered through trigger circuits 116 and 118, respectively, to the fixed contacts of a double pole three position selector switch indicated generally at 120 and having positions A, B and C.

This counting system is provided in order to delay the start of the correction function past the early part of the record where the correction required is excessively large and would require excessive lengths of delay circuits 48 for full correction. This early part of the record corresponds to shallow depths and is not used in the analysis and interpretation of the seismic records for the reason that the nature of shallow sub-surface formations is not of interest.

As previously noted, the same correction function is applied to each of the record channel delay circuits. In order to provide for the use of different correction functions for each half of a detector spread, two function potentiometers and servo systems are employed: one providing the correction function for detectors lying, for example, on one side of the shot and the other for detectors lying on the other side of the shot. The two start switches 112 and 114 are provided to permit the use of different delays for each half of the spread. The selector switch indicated at 120 is provided in order that either a single correction function or two correction functions may be employed as desired. The two movable arms of the selector switch 120 are respectively connected through conductors 121 and 123 to left and right function generator systems indicated generally at 125 and 127, respectively, in FIGURE 4B.

Placing the movable switch arms of the selector switch 120 on contacts A connects the left function generator to start switch 114 and the right function generator to start switch 112. Placing the movable arms of selector switch 120 on contacts B provides for the reverse connection and placing the arms on contacts C connects the start switch 112 to only the left function generator, the right-hand contact C of selector switch 120 being not connected to either start switch. This last arrangement is used for a uniform spread, i.e., when detectors are positioned uniformly on each side of a shot point, which is the mode of operation most frequently employed and under these conditions only a single function potentiometer is employed in connection with the two servo systems as will be hereinafter described.

With the selector switch 120 set as shown in the drawing, the start switch 114 is not used and at the time set on start switch 112 a pulse from the decade counter 110 passes, through the trigger circuit 116 and through the selector switch 120 to initiate action of the left function generator as will be hereinafter described. The trigger circuit 116, upon the passage of a pulse therethrough, acts to operate the flip flop circuit 94 and close the gate circuit 96 and actuate a pulse reset circuit 126 to reset the decade counters 106 and 110 to zero.

Figure 4B:
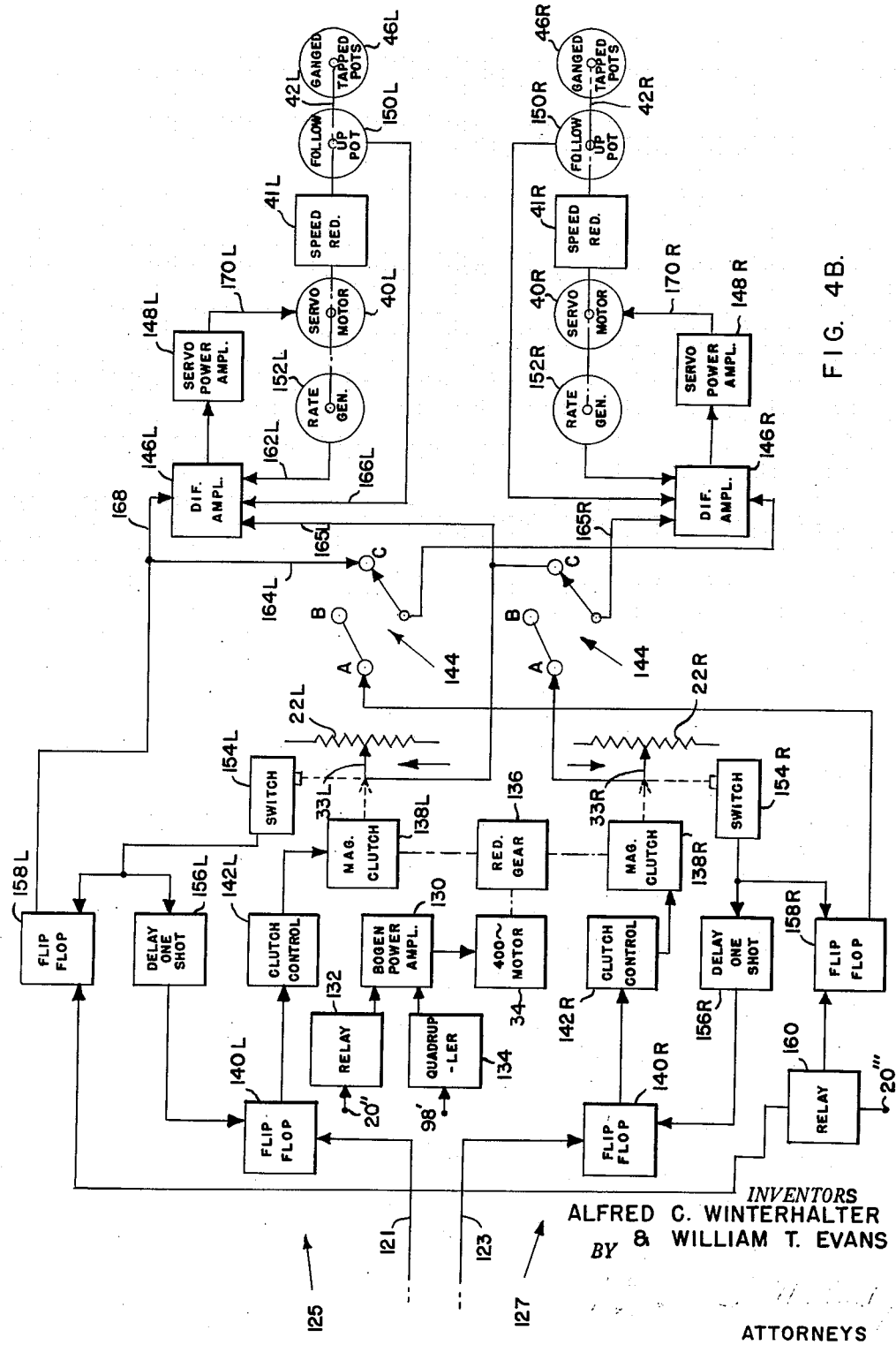

A Bogen amplifier 130 in FIGURE 4B is initially positioned in a "stand-by" condition and when the camera 18 in FIGURE 1 is operated to begin recording a signal is received at terminal 20" to operate a relay 132 connected to the Bogen amplifier 130 putting the amplifier in "operate" condition. The 100 cycle reference signal is delivered to a quadrupler 134 from terminal 98' and the quadrupled output is amplified by the Bogen amplifier 130 and delivered to a 400 cycle synchronous motor 34. The motor 34 is connected through reduction gearing 136 to magnetic clutches 138L and 138R, the output sides of which are connected to potentiometer arms 33L and 33R, respectively of the function potentiometers 22L and 22R respectively. It will be evident that each of these potentiometers is identical with that described in connection with FIGURE 2 and serves to provide a correction function such as described in connection with FIGURE 2, in FIGURE 4B there being shown the complete system which has two function generators each having associated delay circuits.

With the selector switch 120 in the position shown in FIGURE 4A, and considering only the left function generator, the pulse from the decade counter 110 and the start switch 112 passing through the trigger circuit 116 and the switch 120 passes to a flip flop circuit 140L which operates a clutch control 142L to operate the left magnetic clutch 138L closing the clutch 138L and causing the motor 34 to drive the slide arm 33L of the left function potentiometer 22L. Similar control circuitry is provided for the magnetic clutch 138R controlling operating of the slide arm 33R of the right function potentiometer as a result of pulses received from either the start switch 112 or start switch 114 depending upon the setting of the selector switch 120.

A two pole three position selector switch 144, having contact positions A, B, and C, is arranged for interlocked operation (not shown in the drawing) with the selector switch 120. The positions A, B, or C of the selector switch 144 being occupied by its selector arms when equivalent positions A, B or C, respectively, are occupied by the selector arms of the selector switch 120, and the two selector arms being associated with the right and left function generator, respectively.

With the selector switches in the positions shown, the potentiometer slider 33L is connected to a differential amplifier 146L and is connected to point C of the right-hand side of the selector switch 144. The moveable arm of the right-hand selector switch 144 is connected to the differential amplifier 146R. The potentiometer slider 33R is connected to the open terminals A and B of the right-hand selector switch 144. Thus, with the selector switch 144 in the position shown in the drawing, the slide arm 33L of the left-hand function potentiometer is connected to both of the differential amplifiers 146L, 146R, and the slide arm 33R of the right-hand function potentiometer is open circuited at switch contacts A, B. The output of the differential amplifier 146L is delivered to a servo power amplifier 148L, the output of which is delivered to a servo motor 40L. The servo motor drives a speed reducer 41L, a follow-up potentiometer 150L and a stack of potentiometers 46L connected to the speed reducer output shaft 42. The output of the follow-up potentiometer is delivered to the differential amplifier 146L. The servo motor also drives a rate generator 152L, the output of which is delivered to the differential amplifier 146L. The right-hand side of the circuit includes a similar arrangement of differential amplifier 146R, servo power amplifier 148R, servo motor 40R, speed reducer 41R, follow-up potentiometer 150R, delay circuit potentiometers 46R and rate generator 152R. Follow-up potentiometers 150L and 150R are of identical winding angles as the tapped potentiometer 46L and 46R.

From the foregoing, it will be evident that each of the right-hand and left-hand systems shown in FIGURE 4B include a function potentiometer 22 and ganged delay circuit potentiometer 46—46' and delay circuits 48—48' associated therewith, as described in connection with FIGURE 2, the function potentiometers and the ganged potentiometers being illustrated simply in FIGURE 4B as 22L and 22R, and 46L and 46R.

As previously described, in connection with FIGURE 2, the angular position of the slider of each of the potentiometers 46—46' associated with the delay circuits determines the correction applied to each channel of seismic records. The function of the servo system is to drive the shaft 42 and the potentiometer sliders so that the position of each of the sliders is always proportional to the voltage at the slider 33 of the function potentiometer 22. The operation and details of construction of this portion of the circuit will be described in detail in connection with FIGURE 5.

With the switches 120 and 144 positioned as shown in the drawings, when operation of the apparatus is initiated the slide arms of the delay circuit potentiometers 46 are immediately driven by the servo systems to the position called for by the initial correction voltage provided by the slide arm 33L of the function potentiometer as determined by the setting of its associated potentiometer 30, such as shown in FIGURE 2. After the delay time interval selected by the start switch 112 shown in FIGURE 4A, the clutches 138L and 138R close and the voltage function begins to sweep through its range as set up on the function potentiometer 22L with the slide arms of the tapped delay circuit potentiometers 46L and 46R following. When the function potentiometer slide arm 33L reaches the end of the potentiometer winding, a switch 154L is operated to send a pulse to a delay one shot circuit 156L and to a flip flop circuit 158L. The delay one shot 156L provides sufficient delay to permit the potentiometer slider 33L to pass through the open space at the end of the potentiometer and reach its "home" position. The delay circuit 156L then operates the flip flop circuit 140L to operate the clutch control 142L and release the magnetic clutch 138L to stop the travel of the function potentiometer shaft. It will be evident that the apparatus just described is provided in duplicate on the right-hand side of the function generator circuit, except that the output of the flip flop circuit 158R is connected to the stationary terminals A and B of the left-hand side of selector switch 144, whereas the output of the flip flop circuit 158L is connected to the differential amplifier 146L and is connected to contact C of the right-hand side of selector switch 144 and through the moveable contact arm thereof to the differential amplifier 146R.

With the selector switches 120 and 144 in the positions shown in the figures, only the left-hand function generator circuit is operative and the flip flop circuit 158L disables both of the differential amplifiers and servo amplifiers to stop operation of the servo motors and leave the tapped delay circuit potentiometers in positions of "final" correction of the function potentiometer voltage, as determined by the position of its associated potentiometer, such as shown at 32 in FIGURE 2. The arrangement is such that at this time the required correction for the various seismic record channels is either zero or changing so slowly as to be essentially constant.

At the end of the recording interval, operation of the control for the camera 18 operates a relay 160 which is connected to the camera through conductor 20''' and which resets the flip flop circuits 158L and 158R and turns on the servo amplifiers 148L and 148R to allow the servo motors to drive the shafts 42L and 42R and the potentiometer slide arms 44 to the "initial" position called for by the function voltage in preparation for the next operation of the system.

With the exception of the circuit of the servo and differential amplifiers, the various circuits employed in the arrangement shown in FIGURES 4A and 4B are entirely conventional and details of the circuitry need not be described herein. Details of the servo system circuitry are shown in FIGURE 5.

FIGURE 5 is an electrical diagram showing circuit details of the servo system involved in each of the right-hand and left-hand portions of FIGURE 4B. As shown in FIGURE 4B and 5, the four inputs to each of the differential amplifiers 146 are line 168 from one of the flip flop circuits 158 serving as amplifier shut-off control, line 165 from one of the function potentiometers, line 166 from its associated follow-up potentiometers and line 162 from its associated rate generator. The output of each differential amplifier is fed to its associated servo power amplifier 148. The output of each power amplifier is connected through line 170 to its associated servo motor 40.

As shown in FIGURE 5, the servo motor 40 is provided with two windings 172 and 174 electrically displaced within the motor and connected at a common grounded connector. The winding 172 is supplied with power through line 170 from the servo power amplifier 148. The winding 174 is supplied with power from terminal 178 through a phase shifting condenser 176.

The rate generator 152 is provided with a pair of windings 180 and 182 electrically displaced within the generator. The winding 180 has one end connected to power through terminal 178 and the other end grounded. The winding 182 has one end grounded and the other end connected through conductor 162 to the differential amplifier 146.

The follow-up potentiometer 150 has one end of its resistance winding connected to L1 and the other end of its resistance winding connected to L2, the same power source as is connected across the function potentiometer 22 shown in FIGURE 2. The slide arm of the follow-up potentiometer is connected through line 166 to the differential amplifier as previously noted.

As previously noted the function of the servo system is to drive the shaft 42 so that the position of each of the delay circuit potentiometer arms 44—44' is always proportional to the voltage at the slide arm 33 of its associated function potentiometer 22. By connecting the slider of the function potentiometer to one input of the differential amplifier and by connecting the slider of the follow-up potentiometer to the other input of the differential amplifier, when the follow-up potentiometer and the ganged delayed circuit potentiometers have their sliders in the position called for by the voltage output of the function potentiometer, there is no error signal and thus no differential input to the differential amplifier between input lines 165 and 166. As the function potentiometer slider 33 moves changing the function voltage of the differential amplifier, an error signal is produced which is amplified causing the servo motor to drive the control shaft 42 in the direction to reduce the error signal. The output of the induction rate generator 40 delivered to the amplifier at 162 provides a velocity feed back for stability.

The two input signals delivered to the differential amplifier through lines 165 and 166 are delivered to the control grids of triodes 186 and 188, respectively. The cathodes of the two triodes are connected across the input side of the transformer 190 and are connected through resistances 192 and 194, respectively, to a negative power source through a conductor 196. The anodes of the two triodes 186 and 188 are connected to a positive power source through a balancing potentiometer 197 and a conductor 198 connected to the potentiometer slide arm.

One end of the output winding of a transformer 190 is connected to the slide arm of a potentiometer 200, and one end of the winding of which is connected to ground and the other end is connected to the rate generator through conductor 162. The other end of the output side of the transformer 190 is connected to the control grid of a pentode 202. The anode output of the pentode 202 is delivered to the power amplifier indicated generally at 148.

The power amplifier 148 includes a pair of triodes 204 and 206. The output from the pentode 202 is connected to the grid of triode 204. The grid of triode 206 is connected to ground through a resistor 208. The cathodes of triodes 204 and 206 are connected together and grounded through a cathode resistance 210 and the anode output of these triodes are delivered through the control grids of a pair of tetrodes 212 and 214, respectively. The anodes of the two tetrodes are connected to opposite ends of the input winding of a transformer 214 which has a center tap connected to the positive power source through conductor 198. The output winding of the transformer 214 is connected between ground and the input 170 of the servo motor 40.

During normal operation of the differential amplifier the error signal between the input voltages at 165 and 166 will be amplified and delivered as an output potential at terminal 170. The voltage applied at 162, as a result of operation of the rate generator, will modify this output potential to provide desired stability. At the end of the cycle of operation it is necessary to arrest the operation of the servo motor and shut off the output of the amplifier. For this purpose a potential is delivered to terminal 168 from the flipflop circuit 158 sufficient to bias the grid of pentode 202 to cut off and thus cutting off the output of the amplifier and arresting the operation of the servo motor.

Broadly the overall operation of the apparatus described is as follows. A start pulse received from the recording camera 18 shown in FIGURE 1 followed by the receipt of the time break from the seismic record sets up the circuits shown in FIGURE 4A for the passage of the hundred cycle timing wave which is recorded with the original seismic recording. This timing wave is fed through counters to start switches in order to permit the delay of a predetermined period of time before the clutches are engaged whereby the synchronous motor driven by the hundred cycle timing wave causes displacement of the slide arms of the function potentiometers 22. Two start switches are provided so that the corrections for the two halves of the spread may be started independently. Two function potentiometers are provided, one for each half of the spread and selector switches are provided, whereby, if desired, one of the start switches and one of the function potentiometers may be employed on both sides of the spread. The output of each function potentiometer is a voltage signal for delivery to a servo motor which drives the slide arms of a stack of potentiometers each associated with a delay circuit connected in a record channel.

Each of the recorded seismic signals is picked up from the multi-channel record member 10 and fed through an individual delay circuit 48. Each delay circuit has associated therewith a potentiometer 46 which is tapped uniformly and has its slide arm positioned in accordance with the function output of its associated function potentiometer 22 which is in turn determined by the settings of the shunt potentiometers 26 and 28 as well as the settings of the initial and final potentiometers 30 and 32, respectively. The delay circuit potentiometer for the outermost records, i.e., the records from detectors spaced most distantly from the shot, will have the greatest number of taps since these records require the greatest time delay change. The potentiometers associated with the delay circuits for the inner records, i.e., records from detectors spaced close to the shot, have less taps since less time delay change is required for these records. In some instances the inner-most detector records may not require any time delay change.

As previously noted, when the seismic signals are received from depths in the earth which are relatively great with respect to the detector spacing and uniform detector spacing is employed, the ratios between the corrections of each channel are essentially constant thus a single function generator can be used to correct all the channels of each half of the detector spread, and when a balanced spread is employed a single function generator may be used to correct all channels of both halves of the spread.

During movement of the function potentiometer slide arm 33 increasing delays are imposed on the seismic signals through the delay circuits until at the end of the travel of the slide arm 33 of the function potentiometer further operation of the servo motor is arrested and the remainder of the seismic records passing through the delay networks are provided with unchanging delays until the end of the seismic record is reached.

When the end of the seismic record is reached and the operation of the recording camera 18 is arrested a signal is supplied to the servo power amplifier and the amplifier operates to return the servo motor and the shaft driven thereby to the "initial" position of the function potentiometer 33.

It will be evident that with conventional plug-in type electronic equipment, the number of delay stages in each of the delay circuits may be provided to accommodate the necessary time delay change required for each particular seismic channel. The overall delay period for each channel is thus individually provided. However, inasmuch as the rate of change of this delay period from maximum to minimum delay is not linear, the non-linearity of this change is provided by setting the shunt potentiometers 26 and 28 of one or both function potentiometers 22 which then serve by their voltage outputs to provide the necessary non-linear correction function to the individual delay circuits for each of the seismic channels.

The apparatus thus provides an easily adjusted and highly flexible apparatus for adjusting for stepout of the various channels of a seismic recording.

It should be noted that while in this application the original seismic records are described as being picked up from magnet records and the ultimate corrected records are described as being photographically recorded, various other well known recording, reproducing and visual recording means may be employed and that these and other modifications may be made to the embodiment of the invention disclosed herein without departing from the scope of the invention as set forth in the following claims.

What is claimed is:

1. Apparatus for the reproduction of seismic records comprising pickup means constructed and arranged to provide electrical signals from a seismic record, a multi-section electrical delay line arranged to receive said electrical signals, variable impedance means arranged to pick up signals serially from various parts of said delay line and including a member movable to vary the impedance thereof, means for moving said member to vary said impedance, and means including a function generator having a variable output for controlling said moving means to vary said movement of said member to provide varying delays between portions of signals received by the delay line and their counterpart signals picked up by said variable impedance means.

2. Apparatus for the reproduction of seismic records comprising pickup means constructed and arranged to provide electrical signals from a seismic record, a multi-section electrical delay line arranged to receive said electrical signals, variable means arranged to pick up signals serially from various parts of said delay line, the last mentioned means comprising a resistance array having successive points thereof connected to successive points of the delay line and a contact moveable along said resistance array, means operatively connected to said contact for moving the same, and means including a function generator having a variable output for variably controlling said moving means to vary said movement of said contact to provide varying delays between portions of signals received by the delay line and their counterpart signals picked up by said variable means.

3. Apparatus for the reproduction of seismic records comprising pickup means constructed and arranged to provide electrical signals from a seismic record, a multisection electrical delay line arranged to receive said electrical signals, variable impedance means arranged to pick up signals serially from various parts of said delay line and including a member movable to vary said impedance, means for driving said member through a movement to vary said impedance, and means including an adjustable voltage function generator connected to said driving means for controlling the same to vary the movement of said member to provide varying delays between portions of signals received by the delay line and their counterpart signals picked up by said variable means.

4. Apparatus for the reproduction of seismic records comprising pickup means constructed and arranged to provide electrical signals from a seismic record, a multisection electrical delay line arranged to receive said electrical signals, variable means arranged to pick up signals serially from various parts of said delay line, the last mentioned means comprising a resistance array having successive points thereof connected to successive points of the delay line and a contact movable along said resistance array, electrically operated means for driving said contact along said resistance array, and means including an adjustable voltage function generator electrically connected to said driving means for controlling the same to vary said movement of said contact to provide varying delays between portions of signals received by the delay line and their counterpart signals picked up by said variable means.

5. Apparatus for the reproduction of seismic records comprising pickup means constructed and arranged to provide electrical signals from a seismic record, a multisection electrical delay line arranged to receive said electrical signals, variable impedance means arranged to pick up signals serially from various parts of said delay line and including a member movable to vary said impedance, and means including an electrical function generator and means for driving said member in response to the changing output of said electrical function generator to provide varying delays between portions of signals received by the delay line and their counterpart signals picked up by said variable means.

6. Apparatus for the reproduction of seismic records comprising pickup means constructed and arranged to provide electrical signals from a seismic record, a multisection electrical delay line arranged to receive said electrical signals, said delay line being of a type such that each section provides a constant delay throughout a wide frequency band, variable means arranged to pick up signals serially from various parts of said delay line, the last mentioned means comprising a resistance array having successive points thereof connected to successive points of the delay line and a contact moveably along said resistance array, and means including an electrical function generator and means for driving said movable contact in response to the changing output of said electrical function generator to provide varying delays between portions of signals received by the delay line and their counterpart signals picked up by said variable means.

7. Apparatus for the reproduction of seismic records comprising a plurality of means each constructed and arranged to provide electrical signals from a separate seismic record, a multisection electrical delay line arranged to receive said electrical signals from each pickup and each delay line including variable impedance means arranged to pick up signals serially from successive parts of the delay line and including a member movable to vary said impedance, means for driving each of said members simultaneously, and means including a single function generator for controlling said driving means to vary the movement of each of said members to provide varying delays between portions of signals received by each delay line and their counterpart signals picked up by its variable means.

8. Apparatus for the reproduction of seismic records comprising a plurality of pickup means each constructed and arranged to provide electrical signals from a separate seismic record, a multisection electrical delay line arranged to receive said electrical signals from each pickup and each delay line including variable means arranged to pick up signals serially from successive parts of the delay line, said last mentioned means each comprising a resistance array having successive points thereof connected to successive points of its associated delay line and a contact movable along the resistance array means for driving each of said contacts simultaneously, and means including a single function generator for controlling said driving means to vary the movement of each of said contacts to provide varying delays between portions of signals received by each delay line and their counterpart signals picked up by its variable means.

9. Apparatus for the reproduction of seismic records comprising pickup means constructed and arranged to provide electrical signals from a seismic record, a multisection electrical delay line arranged to receive said electrical signals, variable means arranged to pick up signals serially from various parts of said delay line, said variable means comprising a resistance array having successive points thereof connected to successive points of the delay line and a contact movable along the resistance array, a second resistance array having variable sections, means for applying a potential across said second array, second contact means movable along said second array, and means responsive to the potential of said second contact means for driving said variable means contact to provide varying delays between portions of signals received by the delay line and their counterpart signals picked up by said variable means.

10. Apparatus for the reproduction of seismic records comprising pickup means constructed and arranged to provide electrical signals from a seismic record, a multisection electrical delay line arranged to receive said electrical signals, variable means arranged to pick up signals serially from various parts of said delay line, the last mentioned means comprising a resistance array having successive points thereof connected to successive points of the delay line and a contact movable along said resistance array, a resistance array having variable sections, means for applying a potential across said array, contact means moveable along said array, and means including a servo motor responsive to the potential of said contact means for driving said moveable contact to provide varying delays between portions of signals received by the delay line and their counterpart signals picked up by said variable means.

11. Apparatus for the reproduction of seismic records comprising pickup means constructed and arranged to provide electrical signals from a seismic record on a record member, pickup means constructed and arranged to provide electrical timing signals from a timing record on said record member, a multisection electrical delay line arranged to receive said electrical signals, variable means arranged to pick up signals serially from various parts of said delay line, a resistance array having variable sections, means for applying a potential across said array, contact means moveable along said array, means driven in synchronism with said timing signals for driving said moveable contact means, and means responsive to the potential of said contact means for driving said variable means to provide varying delays between portions of signals received by the delay line and their counterpart signals picked up by said variable means.

12. Apparatus for the reproduction of seismic records comprising a plurality of pickup means each constructed and arranged to provide electrical signals from a separate record on a single record member, pickup means constructed and arranged to provide electrical timing signals from a timing record on said record member, a multisection electrical delay line arranged to receive said electrical signals from each pickup and each delay line including variable means arranged to pick up signals serially from succesive parts of the delay line, a resistance array having variable sections, means for applying a potential across said array, contact means moveable along said array, means driven in synchronism with said timing signals for driving said moveable contact means, and means responsive to the potential of said contact means for simultaneously driving each of said variable means to provide varying delays between portions of signals received by each delay line and their counterpart signals picked up by its variable means.

13. Apparatus for the reproduction of seismic records comprising pickup means constructed and arranged to provide electrical signals from a seismic record, a multisection electrical delay line arranged to receive said electrical signals, variable means arranged to pick up signals serially from various parts of said delay line, the last mentioned means comprising a resistance array having successive points thereof connected to successive points of the delay line and a contact moveable along said resistance array, a function potentiometer, a follow-up potentiometer identical to said function potentiometer, means for applying identical potentials across said two potentiometers, means for moving the function potentiometer slide arm across the function potentiometer resistance, means responsive to the difference in potential of the slide arms of said two potentiometers for driving the slide arm of said function potentiometer and for driving said moveable contact to provide varying delays between portions of signals received by the delay line and their counterpart signals picked up by said variable means.

14. Apparatus for the reproduction of seismic records comprising pickup means constructed and arranged to provide electrical signals from a seismic record on a record member, pickup means constructed and arranged to provide electrical timing signals from a timing record on said record member, a multisection electrical delay line arranged to receive said electrical signals, variable means arranged to pick up signals serially from various parts of said delay line, the last mentioned means comprising a resistance array having successive points thereof connected to successive points of the delay line and a contact moveable along said resistance array, a function potentiometer, a follow-up potentiometer identical to said function potentiometer, means for applying identical potentials across said two potentiometers, means driven in synchronism with said timing signals for moving the function potentiometer slide arm across the function potentiometer resistance, means responsive to the difference in potential of the slide arms of said two potentiometers for driving the slide arm of said function potentiometer and for driving said moveable contact to provide varying delays between portions of signals received by the delay line and their counterpart signals picked up by said variable means.

15. Apparatus for the reproduction of seismic records comprising a plurality of pickup means each constructed and arranged to provide electrical signals from a separate seismic record on a record member, pickup means constructed and arranged to provide electrical timing signals from a timing record on said record member, a multisection electrical delay line arranged to receive said electrical signals from each pickup and each delay line including variable impedance means arranged to pick up signals serially from successive parts of the delay line and including a member movable to vary said impedance, a function potentiometer, a follow-up potentiometer identical to said function potentiometer, means for applying identical potentials across said two potentiometers, means driven in synchronism with said timing signals for moving the function potentiometer slide arm across the function potentiometer resistance, means responsive to the difference in potential of the slide arms of said two potentiometers for driving the slide arm of said function potentiometer and for simultaneously driving each of said variable means movable members to provide varying delays between portions of signals received by each delay line and their counterpart signals picked up by its variable means.

16. Apparatus for the reproduction of seismic records comprising pickup means constructed and arranged to provide electrical control and seismic signals from a seismic record, a multisection electrical delay line arranged to receive said electrical seismic signals, variable impedance means arranged to pick up signals serially from various parts of said delay line including a member movable to vary the impedance means for driving said variable means to provide varying delays between portions of signals received by the delay line and their counterpart signals picked up by said variable means, and means responsive to said electric control signals for initiating and controlling operation of said driving means.

17. Apparatus for the reproduction of seismic records comprising a plurality of pickup means constructed and arranged to provide separate electrical signals from a multi channel seismic record, multisection electrical delay lines each arranged to receive one of said electrical signals, two groups of variable means arranged to pick up signals serially from various parts of each delay line and including a movable impedance varying member, and two separate means each driving the movable member of a group to provide varying delays between portions of signals received by each delay line and their counterpart signals picked up by said variable means.

18. Apparatus for the reproduction of seismic records comprising a plurality of pickup means constructed and arranged to provide separate electrical seismic and control signals from a multi channel seismic record, multisection electrical delay lines each arranged to receive one of said electrical seismic signals, two groups of variable means arranged to pick up signals serially from various parts of each delay line and including a movable impedance varying member, two separate means each driving the movable member of a group to provide varying delays between portions of signals received by each delay line and their counterpart signals picked up by said variable means, and means responsive to said control signals for individually initiating operation of each of said driving means.

References Cited in the file of this patent

UNITED STATES PATENTS

| | | |
|---|---|---|
| 2,257,859 | Rosaire | Oct. 7, 1941 |
| 2,275,736 | Cloud | Mar. 10, 1942 |
| 2,604,955 | Hawkins | July 29, 1952 |
| 2,752,092 | McDonal | June 26, 1956 |
| 2,800,639 | Lee | July 23, 1957 |